United States Patent Office 3,432,525
Patented Mar. 11, 1969

3,432,525
PROCESS FOR THE PRODUCTION OF ALKALINE EARTH METAL SALTS OF TOCOPHEROL DIBASIC ACID HEMIESTERS
Shizumasa Kijima, Hino-shi, Tokyo, and Takeshi Konita, Saitama, Japan, assignors to Eisai Co., Ltd., Tokyo, Japan, a corporation of Japan
No Drawing. Filed Mar. 18, 1966, Ser. No. 535,344
Claims priority, application Japan, May 24, 1965, 40/30,189
U.S. Cl. 260—345.5                                6 Claims
Int. Cl. C07d 7/22; A61k 15/10

ABSTRACT OF THE DISCLOSURE

A process for the preparation of alkaline earth metal salts of tocopherol dibasic acid hemiesters in which a tocopherol dibasic acid hemiester is neutralized with a solution of lithium hydroxide in a lower alcohol and is then reacted with either the chloride or the nitrate of an alkaline earth metal. The alkaline earth metal salts of tocopherol dibasic acid hemiesters are substantially equivalent on a molecular basis to α-tocopherol and exhibit vitamin E activity.

The present invention relates to an improved process for the production of alkaline earth metal salts of tocopherol dibasic acid hemiesters.

Tocopherols and the esters thereof (including their dibasic acid hemiesters) have vitamin E biological activity and, hence, they have been used for various purposes, such as remedies, nutrients and feed additives. However, since tocopherols are oily at room temperature and the esters thereof (including their dibasic acid hemiesters) are oily, waxy, or low melting point crystals, various troubles have been encountered in using or treating them. On the other hand, since the alkaline earth metal salts of tocopherol dibasic acid hemiesters are solids having relatively high melting points and since they are very stable, it is very easy to handle them. Alkaline earth metal salts of tocopherol dibasic acid hemiesters are substantially equivalent on a molucular basis to α-tocopherol and exhibit vitamin E activity. They can be administered in dosage forms and amounts corresponding on a molecular basis to those used for α-tocopherol.

Therefore, an object of this invention is to provide an improved process for producing stable alkaline earth metal salts of tocopherol dibasic acid hemiesters.

According to the process of this invention, an alkaline earth metal salt of a tocopherol dibasic acid hemiester is produced by carrying out the neutralization of the tocopherol dibasic acid hemiester with lithium hydroxide in a lower alcohol solution and then reacting the neutralized product with the chloride or the nitrate of an alkaline earth metal. The process of this invention is shown also by the following general reaction formulas:

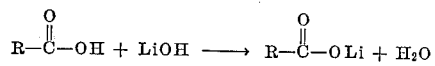

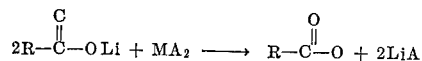

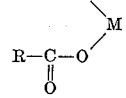

wherein

is a tocopherol dibasic acid hemiester, M is an alkaline earth meta, and A is a haogen atom or a nitrate group. The tocopherol dibasic acid hemiester may be obtained by reacting a tocopherol with an anhydrous dibasic acid, such as, succinic anhydride, maleic anhydride and phthalic anhydride. In the process of this invention, both the naturally occurring d-form and the synthetic dl-form of tocopherol dibasic acid hemiesters may be used.

Among the alkaline earth metal salts of tocopherol dibasic acid hemiesters, the calcium salt of dl-α-tocopherol succinic acid hemiester and the method of producing it have already been disclosed in L. I. Smith et al: "Journal of American Chemical Society," vol. 64, 1084–1086 (1942), and U.S. Patent 2,407,726 (1946). In this known method, the calcium salt of dl-α-tocopherol succinic acid hemiester is prepared by dissolving dl-α-tocopherol succinic acid hemiester in methanol, adding concentrated aqueous ammonia into the methanolic solution, then adding an excessive amount of a methanol solution of calcium chloride (a viscous oil is separated), adding therein a further amount of concentrated aqueous ammonia followed by stirring for a while (the viscous oil is solidified), removing the liquid phase by decantation, after washing the precipatate with acetone removing the solvent by distillation under a reduced pressure, dissolving the residue in hot dioxane, pouring the dioxane solution into a large amount of cold acetone with vigorous stirring to form a precipitate, which is separated from the liquid by decantation. After repeating the above separating procedure several times and removing the solvent by distillation, the calcium salt of dl-α-tocopherol succinic acid hemiester is obtained. This known method has, however, a number of disadvantages, such as, the yield of the calcium salt is very low, for example, from 36% to 71%, the procedure is very complicated, and since the acetone and dioxane form a mixed solvent, the recovery of the individual solvents is very difficult. Moreover, in such a method, the separation of the liquid phase from the solid phase is carried out by decantation, which makes the method unsuitable for industrial use.

The inventors have investigated various filtering methods and solvent systems in order to conduct the separating procedure by filtration. For example, there have been investigated not only the above-described Smith method wherein the precipitate was dissolved in dioxane and the solvent was poured into cold acetone to form a precipitate, but also a method wherein the precipitate was dissolved in ligroin and the solution was poured into acetone and a method wherein the precipitate was dissolved in dioxane and the solution was poured into methanol. However, the filtration was very difficult in all of these cases.

The inventors, however, have found that when a tocopherol dibasic hemiester is neutralized with lithium hydroxide in a lower alcohol or a water-containing lower alcohol, the lithium salt of the tocopherol dibasic acid hemiester is formed almost quantitatively, without any saponification of the ester. When the neutralized product is reacted with a halide or a nitrate of an alkaline earth metal dissolved in a lower alcohol or a water-containing lower alcohol, only the alkaline earth metal salt of the tocopherol dibasic acid hemiester is precipitated in the lower alcohol or the water-containing lower alcohol, with an extremely high yield.

Since all the reaction steps can be carried out in same solvent in the process of this invention, the procedure is very simple and easy and, further, since the product thus produced can be very easily separated by filtration and the yield is very high, the alkaline earth metal salts of tocopherol dibasic acid hemiesters can be produced at a low cost and very easily on an industrial scale.

The lower alcohols that can be used for the purposes of this invention include methanol and ethanol. While the lithium salts of tocopherol dibasic acid hemiesters are soluable in methanol, ethanol and aqueous solutions thereof, the alkaline earth metal salts thereof are almost completely insoluble in these solvents. The concentration of the alcohol of the water-alcohol mixture is preferably above 70%, in the formation of precipitate and the filtration of the precipitate.

In carrying out the invention, a tocopherol dibasic acid hemiester is dissolved in a lower alcohol and into the solution is added dropwise a lower alcohol solution of lithium hydroxide, with stirring, at room temperature, until the solution (A solution) becomes neutral as detected by a pH indicator. Thereafter, this solution (A solution) is added dropwise into a slightly excessive amount of a lower alcohol solution (B solution) of a halide or a nitrate of an alkaline earth metal, with stirring, at room temperature, whereby the alkaline earth metal salt of the tocopherol dibasic acid hemiester is precipitated within several minutes after the addition. The period of time required for the addition of the A solution is preferably from 30 minutes to 3 hours and the addition rate may be slow at first and fairly fast at the end. Thereafter, after stirring further for from about 5 minutes to about 15 minutes, by filtering the precipitate and drying the precipitate after washing it with a small amount of a lower alcohol, a white solid powder of substantially pure alkaline earth metal salt of the tocopherol dibasic acid hemiester is obtained.

In the alkaline earth metal salt of the tocopherol dibasic acid hemiester obtained by the process of this invention, there is observed almost no lithium even by a fluorescence analysis.

The process of this invention can be effectively used for the purification of tocopherol dibasic acid hemiesters.

The process of this invention will be further explained in detail by the following examples.

EXAMPLE 1

10.6 g. of crystalline d-α-tocopherol succinic acid hemiester was dissolved in 25 ml. of methanol and an aqueous 3 N lithium hydroxide solution was added dropwise, with stirring, at room temperature, until the solution became neutral as detected by a phenolphthalein indicator. When the thus prepared solution of the lithium salt of d-α-tocopherol succinic acid hemiester was added dropwise, under vigorous stirring, at room temperature, into 50 ml. of a 5% methanol solution of calcium chloride, the calcium salt of d-α-tocopherol succinic acid hemiester was precipitated. After the end of the addition, the system was stirred further for 10 minutes and the precipitate was filtered. The precipitate was then rinsed with a small amount of methanol and dried in vacuo for 2 hours at 60° C. and there was obtained 10.95 g. of a white powder identified as the calcium salt of d-α-tocopherol succinic acid hemiester.

Elementary analysis as $C_{66}H_{106}O_{10}Ca$. Calculated: C, 72.09%; H, 9.71%; Ca, 3.64%. Found: C, 71.96%; H, 9.76%; Ca, 3.64%.

EXAMPLE 2

Crystalline d-α-tocopherol succinic acid hemiester (10.6 g.) was treated as described in the first half of Example 1 to convert it into the lithium salt and the solution was added dropwise into 50 ml. of a methanol solution containing 9.4% calcium nitrate, under vigorous stirring, at room temperature. After filtering and drying the thus-formed precipitate, 11.0 g. of the calcium salt of d-α-tocopherol succinic acid hemiester was obtained.

Elementary analysis. Found: C, 72.37%; H, 10.03%; Ca, 3.58%.

EXAMPLE 3

Crystalline d-α-tocopherol succinic acid hemiester (10.6 g.) was treated as described in the first half of Example 1 so as to be converted into the lithium salt. The solution was then added dropwise into 50 ml. of a methanol solution containing 8.1% magnesium chloride under vigorous stirring. After filtering and drying the thus-formed precipitate, 10.8 g. of the magnesium salt of d-α-tocopherol succinic hemiester was obtained. It was observed that the formation of precipitate was slower compared with the formation of the calcium salt.

Elementary analysis as $C_{66}H_{106}O_{10}Mg$. Calculated: C, 73.13%; H, 9.86%. Found: C, 72.95%; H, 9.84%.

EXAMPLE 4

Crystalline d-α-tocopherol succinic acid hemiester (10.6 g.) was treated as described in the first half of Example 1 so as to be converted into the lithium salt. The solution was then added dropwise into 50 ml. of a methanol solution containing 11.2% of magnesium nitrate (the concentration as the hexahydrate) under vigorous stirring. After recovering through filtration and drying the thus-formed precipitate, 10.75 g. of the magnesium salt of d-α-tocopherol succinic hemiester was obtained.

Elementary analysis. Found: C, 73.04%; H, 9.64%.

EXAMPLE 5

By treating 10.6 g. of crystalline dl-α-tocopherol succinic acid hemiester (melting point 65° C.) according to the procedure described in Example 4, 10.3 g. of the magnesium salt of dl-α-tocopherol succinic acid hemiester, a white powder, was obtained.

Elementary analysis as $C_{66}H_{106}O_{10}Mg$. Calculated: C, 73.13%; H, 9.86%. Found: C, 73.04%; H, 9.64%.

EXAMPLE 6

Crystalline d-α-tocopherol succinic acid hemiester (10.6 g.) was treated as described in the first half of Example 1 so as to be converted into the lithium salt and the solution was added dropwise into 200 ml. of a 2.7% aqueous methanol solution (90%) of barium chloride (2.7% is the concentration as the di-hydrate) with vigorous stirring, at room temperature. After recovering through filtration and drying the thus-formed precipitate, 11.8 g. of the barium salt of d-α-tocopherol succinic acid hemiester was obtained. The period of time between the addition of the lithium salt solution to the formation of the barium salt was shorter than was the case when the calcium salt was formed.

Elementary analysis as $C_{66}H_{106}O_{10}Ba$. Calculated: C, 66.23%; H, 8.93%. Found: C, 66.51%; H, 9.00%.

EXAMPLE 7

2.0 kg. of dl-α-tocopherol succinic acid hemiester was dissolved in 5 l. of methanol and the solution was added dropwise into a 1.8% methanol solution of lithium hydroxide until the solution became neutral as detected by a phenol-phthalein indicator (required about 5 l.). The thus-obtained lithium salt solution was added dropwise into 10 l. of a 4.6% methanol solution of calcium chloride, with vigorous stirring, at room temperature. The thus-formed precipitates was recovered by filtration, washed with a small amount of methanol and dried in vacuo to give 2.04 kg. of the calcium salt of dl-α-tocopherol succinic acid hemiester.

Elementary analysis as $C_{66}H_{106}O_{10}Ca$. Calculated: C, 72.09%; H, 9.71%; Ca, 3.64%. Found: C, 71.89%; H, 9.71%; Ca, 3.61%.

EXAMPLE 8

11.5 g. of dl-α-tocopherol phthalic acid hemiester was dissolved in 50 ml. of methanol and the solution was neutralized with a 3 N aqueous lithium hydroxide solution. The thus-formed lithium salt solution was added dropwise into 100 ml. of a 3% methanol solution of calcium chloride with vigorous stirring and the thus-obtained precipatate was recovered by filtration, washed with methanol and dried in vacuo to give 11.2 g. of the calcium salt of dl-α-tocopherol phthalic acid hemiester (a white powder).

Elementary analysis as $C_{70}H_{106}O_{10}Ca$. Calculated: C, 74.33%; H, 8.94%. Found: C, 74.50%; H, 9.03%.

The embodiments of the invention in which an exclusive property or privilege is claimed are defined as follows:

1. A process for preparing an alkaline earth metal salt of a tocopherol dibasic acid hemiester, which comprises; neutralizing a tocopherol dibasic acid hemiester with lithium hydroxide and reacting the thus-neutralized product with a salt selected from the group consisting of alkaline earth metal chlorides and nitrates.

2. A process as claimed in claim 1, in which the neutralizing step and the reacting step are carried out in an alcohol having less than three carbon atoms.

3. A process as claimed in claim 2, in which said tocopherol dibasic acid hemiester is a member selected from the group consisting of succinic acid, maleic acid and phthalic acid hemiesters of tocopherol.

4. A process as claimed in claim 2, in which said tocopherol dibasic acid hemiester is a member selected from the group consisting of d-α-tocopherol dibasic acid hemiesters and dl-α-tocopherol hemiesters.

5. A process as claimed in claim 2, in which an aqueous solution of the alcohol is used, the amount of the alcohol being at least about 70% by weight.

6. The process as claimed in claim 2, in which said alkaline earth metal is a member selected from the group consisting of calcium, magnesium and barium.

References Cited

UNITED STATES PATENTS

| 2,358,046 | 9/1944 | Baxter et al. | 260—345.5 |
| 2,407,726 | 9/1946 | Smith et al. | 260—345.5 |
| 2,680,749 | 6/1954 | Cawley et al. | 260—345.5 |

OTHER REFERENCES

Smith et al.: Jour. Amer. Chem. Soc., vol. 64, pp. 1084–6 (1942).

HENRY R. JILES, *Primary Examiner.*

JOHN M. FORD, *Assistant Examiner.*

U.S. Cl. X.R.

424—284